(12) United States Patent
Sakaida et al.

(10) Patent No.: US 12,119,487 B2
(45) Date of Patent: Oct. 15, 2024

(54) POSITIVE ELECTRODE MATERIAL AND BATTERY

(71) Applicant: Panasonic Intellectual Property Management Co., Ltd., Osaka (JP)

(72) Inventors: Masashi Sakaida, Hyogo (JP); Izuru Sasaki, Aichi (JP); Norihito Fujinoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 628 days.

(21) Appl. No.: 17/391,050

(22) Filed: Aug. 2, 2021

(65) Prior Publication Data

US 2021/0359303 A1 Nov. 18, 2021

Related U.S. Application Data

(63) Continuation of application No. PCT/JP2019/051326, filed on Dec. 26, 2019.

(30) Foreign Application Priority Data

Feb. 28, 2019 (JP) .................................. 2019-035513

(51) Int. Cl.
*H01M 4/505* (2010.01)
*H01M 4/04* (2006.01)
(Continued)

(52) U.S. Cl.
CPC ......... *H01M 4/505* (2013.01); *H01M 4/0407* (2013.01); *H01M 4/131* (2013.01);
(Continued)

(58) Field of Classification Search
CPC .... H01M 4/505; H01M 4/0407; H01M 4/131; H01M 4/366; H01M 4/525
(Continued)

(56) References Cited

U.S. PATENT DOCUMENTS

2009/0081554 A1  3/2009  Takada et al.
2011/0027661 A1  2/2011  Okazaki et al.
(Continued)

FOREIGN PATENT DOCUMENTS

CN  108701860 A  10/2018
CN  111566851 A   8/2020
(Continued)

OTHER PUBLICATIONS

International Search Report of PCT application No. PCT/JP2019/051326 dated Mar. 24, 2020.
(Continued)

*Primary Examiner* — James M Erwin
(74) *Attorney, Agent, or Firm* — Rimon P.C.

(57) ABSTRACT

A positive electrode material includes a positive electrode active material, a cover layer that covers at least part of a surface of the positive electrode active material and that contains a first solid electrolyte material, and a second solid electrolyte material that is a material different from the first solid electrolyte material. The first solid electrolyte material contains Li, M, and X and does not contain sulfur. M represents at least one element selected from the group consisting of metal elements other than Li and semi-metal elements, and X represents halogen elements including Cl.

24 Claims, 2 Drawing Sheets

(51) Int. Cl.
  *H01M 4/131* (2010.01)
  *H01M 4/36* (2006.01)
  *H01M 4/525* (2010.01)
  *H01M 10/0525* (2010.01)
  *H01M 10/0562* (2010.01)
  *H01M 4/02* (2006.01)

(52) U.S. Cl.
  CPC ............ *H01M 4/366* (2013.01); *H01M 4/525* (2013.01); *H01M 10/0525* (2013.01); *H01M 10/0562* (2013.01); *H01M 2004/028* (2013.01); *H01M 2300/0068* (2013.01)

(58) Field of Classification Search
  USPC ...................................................... 429/231.95
  See application file for complete search history.

(56) References Cited

U.S. PATENT DOCUMENTS

| | | | |
|---|---|---|---|
| 2014/0162113 A1* | 6/2014 | Ohta | ................. H01M 10/0562 429/162 |
| 2014/0377627 A1 | 12/2014 | Furuya et al. | |
| 2017/0309890 A1* | 10/2017 | Shin | ................... C01G 45/1228 |
| 2019/0088995 A1 | 3/2019 | Asano et al. | |
| 2020/0350626 A1 | 11/2020 | Matsumura et al. | |

FOREIGN PATENT DOCUMENTS

| | | |
|---|---|---|
| EP | 3419098 A1 | 12/2018 |
| EP | 3496202 A1 | 6/2019 |
| EP | 3745499 A1 | 12/2020 |
| JP | 8-171938 | 7/1996 |
| JP | 2006-244734 | 9/2006 |
| JP | 2009-193940 | 8/2009 |
| JP | 2014-241282 | 12/2014 |
| JP | 2016-189339 | 11/2016 |
| JP | 7241306 B2 | 3/2023 |
| WO | 2007/004590 | 1/2007 |
| WO | WO-2018025582 A1 * 2/2018 .......... C01F 17/0031 |
| WO | 2019/146236 | 8/2019 |

OTHER PUBLICATIONS

Andreas Bohnsack et al., "The Bromides Li3MBr6 (M=Sm—Lu, Y): Synthesis, Crystal Structure, and Ionic Mobility", Journal of Inorganic and General Chemistry, vol. 623, Sep. 1997, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, vol. 623, Jul. 1997, vol. 623, pp. 1067-1073.

Y. Tomita et al, "Li ion conductivity in the doped Li3InBr6", Proceedings of the 70th Anniversary Meeting of the Electrochemical Society of Japan, Date of issuance: Mar. 25, 2003, p. 384.

The Extended European Search Report dated Mar. 24, 2022 for the related European Patent Application No. 19917517.5.

English Translation of Chinese Search Report dated May 16, 2024 for the related Chinese Patent Application No. 201980091341.5.

* cited by examiner

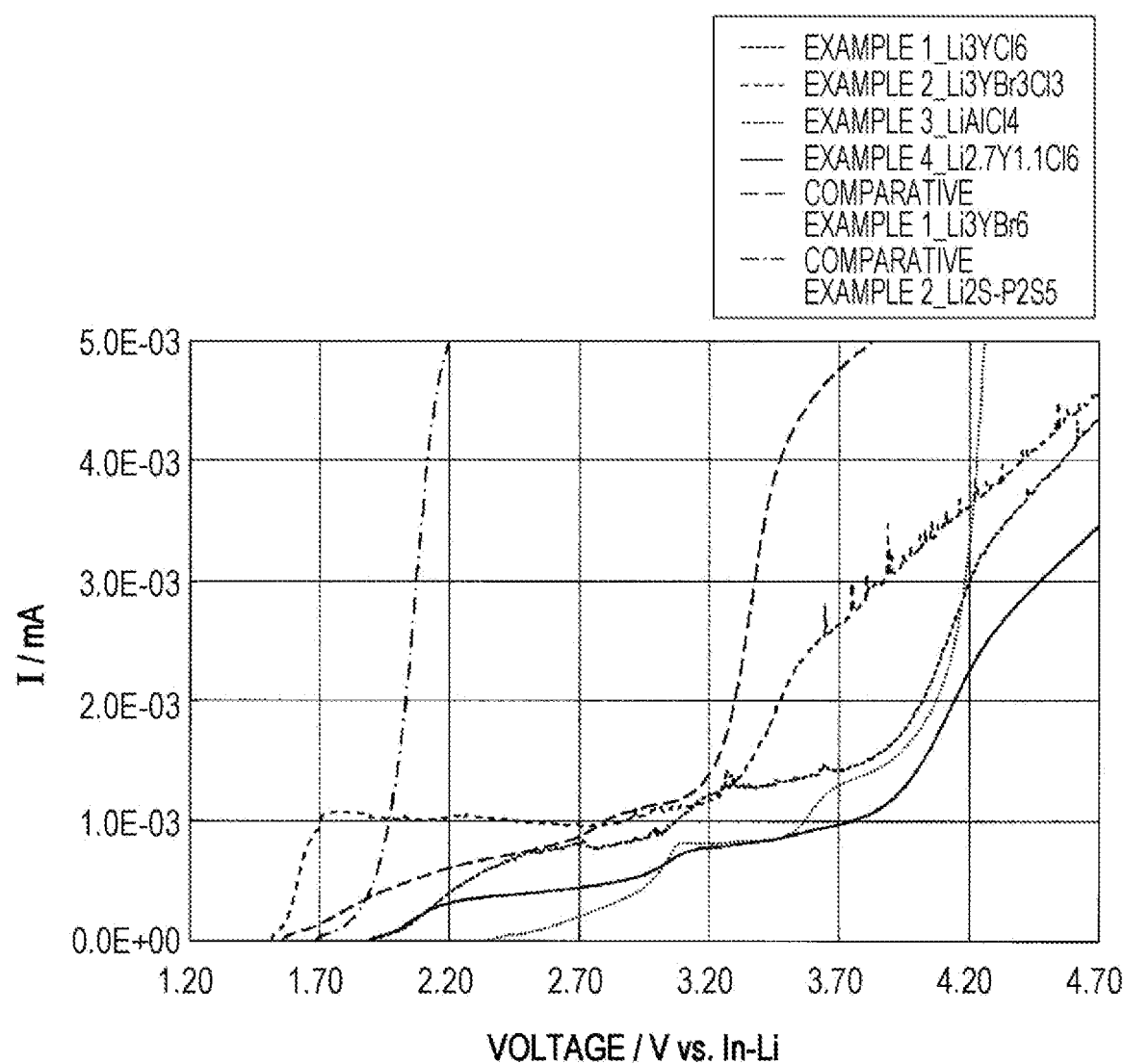

POSITIVE ELECTRODE MATERIAL AND BATTERY

BACKGROUND

1. Technical Field

The present disclosure relates to a battery positive electrode material and a battery.

2. Description of the Related Art

Japanese Unexamined Patent Application Publication No. 2006-244734 discloses a battery in which a halide containing indium is used as a solid electrolyte. Japanese Patent No. 4982866 discloses an all-solid lithium battery in which the surface of a positive electrode active material is covered with a lithium-ion-conductive oxide having substantially no electron conductivity.

SUMMARY

Regarding the related art, it has been desired that a reaction overvoltage of a battery be suppressed from increasing.

In one general aspect, the techniques disclosed here feature a positive electrode material according to an aspect of the present disclosure including a positive electrode active material, a cover layer that covers at least part of a surface of the positive electrode active material and that contains a first solid electrolyte material, and a second solid electrolyte material that is a material different from the first solid electrolyte material, wherein the first solid electrolyte material contains Li, M, and X and does not contain sulfur, M represents at least one element selected from the group consisting of metal elements other than Li and semi-metal elements, and X represents halogen elements including Cl.

According to the present disclosure, a reaction overvoltage of a battery can be suppressed from increasing.

Additional benefits and advantages of the disclosed embodiments will become apparent from the specification and drawings. The benefits and/or advantages may be individually obtained by the various embodiments and features of the specification and drawings, which need not all be provided to obtain one or more of such benefits and/or advantages.

BRIEF DESCRIPTION OF THE DRAWINGS

FIG. 3 is a diagram illustrating the results of evaluation of potential stability of a solid electrolyte material.

DETAILED DESCRIPTION

Figure 1:
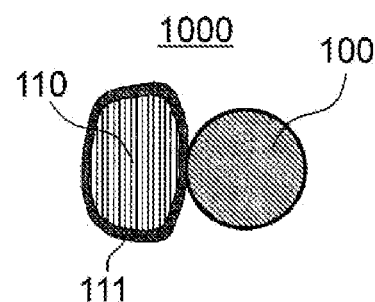
FIG. 1 is a sectional view illustrating the schematic configuration of a positive electrode material in a first embodiment.

The embodiments according to the present disclosure will be described below with reference to the drawings.

First Embodiment

A positive electrode material in the first embodiment includes a positive electrode active material, a cover layer that covers at least part of the surface of the positive electrode active material and that contains a first solid electrolyte material, and a second solid electrolyte material that is a material different from the first solid electrolyte material.

The first solid electrolyte material contains Li, M, and X and does not contain sulfur.

M represents at least one element selected from the group consisting of metal elements other than Li and semi-metal elements.

X represents halogen elements including Cl.

According to the above-described configuration, a reaction overvoltage of a battery can be suppressed from increasing.

Japanese Unexamined Patent Application Publication No. 2006-244734 mentions that, regarding an all-solid secondary battery containing a solid electrolyte composed of an indium-containing compound, the average potential versus Li of the positive electrode active material is desirably less than or equal to 3.9 V and, as a result, a coating film composed of a decomposition product due to oxidative decomposition of the solid electrolyte is favorably formed so as to obtain favorable charge-discharge characteristics. In addition, common layered transition metal oxide positive electrodes of, for example, $LiCoO_2$ and $LiNi_{0.8}Co_{0.15}Al_{0.05}O_2$ are disclosed as the positive electrode active material having an average potential versus Li of less than or equal to 3.9 V.

The present inventors performed research on the resistance to oxidative decomposition of a halide solid electrolyte. The halide solid electrolyte was a material containing a halogen element such as chlorine (=Cl), bromine (=Br), or iodine (=I) as an anion. As a result of the research, it was found that the resistance to oxidative decomposition of the solid electrolyte differs in accordance with the type and the ratio of the element contained as an anion.

Specifically, regarding a battery in which a halide solid electrolyte containing one of or both bromine and iodine (that is, an example of the second solid electrolyte material) was used as the positive electrode material, it was found that oxidative decomposition of the halide solid electrolyte occurred during charging even when a positive electrode active material having an average potential versus Li of less than or equal to 3.9 V was used. In this regard, it was found that there is a problem of a reaction overvoltage of a battery increasing due to an oxidative decomposition product functioning as a resistance layer. It was conjectured that a factor responsible therefor is an oxidation reaction of bromine or iodine contained in the halide solid electrolyte. Herein, the oxidation reaction denotes a common charge reaction in which lithium and electrons are taken from the positive electrode active material of the positive electrode material and, also, a side reaction in which electrons are also taken from the halide solid electrolyte that contains one of or both bromine and iodine and that is in contact with the positive electrode active material. It is conjectured that, in accordance with the oxidation reaction, an oxidative decomposition layer having poor lithium-ion conductivity is formed between the positive electrode active material and the halide solid electrolyte and functions as a large interfacial resistance during an electrode reaction of the positive electrode. It is conjectured that, of the halogen elements, bromine and iodine are readily oxidized due to having a relatively large ionic radius and a small interaction force with a cationic component constituting the halide solid electrolyte.

In addition, it was clarified that a battery in which a halide solid electrolyte containing chlorine is used for the positive electrode material has excellent oxidation resistance and can suppress a reaction overvoltage of the battery from increasing. Although the specific mechanism is not certain, it is conjectured that, when the halide solid electrolyte contains chlorine, which has high electronegativity among halogen elements, in the anion, the anion is strongly bonded to a cation composed of a metal element or a semi-metal element and an oxidation reaction of chlorine, that is, a side reaction in which electrons are taken from chlorine, does not readily proceed.

Further, it was clarified that, even when the halide solid electrolyte contains one of or both bromine and iodine, the oxidation resistance is improved by chlorine being concurrently contained. Although the specific mechanism is not certain, it is conjectured that chlorine having a small ionic radius and strong bondability to a cation being concurrently contained decreases the bonding distance between the cation and the anion, thereby enhancing the bondability between bromine or iodine and the cation, and, as a result, the oxidation reaction of bromine and iodine is suppressed from occurring.

Oxidative decomposition readily occurs as the content of bromine or iodine in the halide solid electrolyte increases. For example, when the halide solid electrolyte contains both bromine and chlorine as the anion, excellent oxidation resistance is exhibited as the ratio of bromine is decreased, that is, as the ratio of chlorine is increased.

The above-described difference in the oxidation resistance in accordance with the anion species contained in the halide solid electrolyte, that is, the property in which excellent oxidation resistance is exhibited when chlorine is contained and in which the oxidation resistance is degraded when one of or both bromine and iodine are contained is determined on the basis of the ionic radius and the electronegativity of the anion, and, therefore, does not depend on the type of the cation (that is, the metal element other than Li or the semi-metal element) contained in the halide solid electrolyte.

On the other hand, from the viewpoint of ion conductivity which is an indicator of the movement speed of a lithium ion, favorable characteristics are exhibited when the anion contained in the halide solid electrolyte includes bromine or iodine which is an anion having a larger ionic radius than chlorine. The reason for this is considered to be that as the bonding distance between the positively charged lithium ion and the negatively charged anion increases, the interaction force between the lithium ion and the anion is reduced and lithium ions can move at a high speed. As the ion conductivity increases, the output characteristics of the battery including the solid electrolyte can be improved.

Japanese Patent No. 4982866 mentions that, even though a high-resistance layer is generated through contact of a sulfide positive electrode active material with a positive electrode active material that causes a redox reaction at a potential greater than or equal to 3 V, a lithium-ion-conductive oxide that does not have electron conductivity covering the positive electrode active material surface enables the high-resistance layer to be suppressed from being formed. The sulfide solid electrolyte is a material having high ion conductivity but has an oxidation resistance problem akin to that of the halide solid electrolyte that contains at least one of or both bromine and iodine.

That is, to suppress the solid electrolyte from undergoing oxidative decomposition to decrease the reaction overvoltage of a battery, it is necessary to select a solid electrolyte having excellent oxidation resistance. In addition, to improve the output characteristics of the battery, it is necessary to select a solid electrolyte having high ion conductivity. Regarding the battery composed of a single solid electrolyte, it is difficult to simultaneously satisfy a decrease in the reaction overvoltage of the battery and an improvement in the output characteristics of the battery.

After considering all the above-described findings, it is conjectured that the halide solid electrolyte containing chlorine (that is, the first solid electrolyte material) and being located on the surface of the positive electrode active material to form the cover layer enables the second solid electrolyte material to be suppressed from undergoing an oxidation reaction so as to suppress the reaction overvoltage from increasing. In this regard, when a material having high ion conductivity but having an oxidation resistance problem is used as the second solid electrolyte material, the first solid electrolyte material that has excellent oxidation resistance and is located on the surface of the positive electrode active material suppresses direct contact between the positive electrode active material and the second solid electrolyte material from occurring. This is because the electron resistance of the halide solid electrolyte containing chlorine is very high and, therefore, electrons are suppressed from being directly transferred between the positive electrode active material and the second solid electrolyte material. According to the above-described configuration, the output characteristics of the battery can be improved while the second solid electrolyte material is suppressed from undergoing an oxidation reaction so as to decrease the reaction overvoltage of the battery.

In this regard, "semi-metal element" includes B, Si, Ge, As, Sb, and Te.

"Metal element" includes all elements of group I to group XII of the periodic table except for hydrogen and all elements of group XIII to group XVI except for B, Si, Ge, As, Sb, Te, C, N, P, O, S, and Se. That is, "metal element" is an element that can become a cation when forming an inorganic compound with a halogen compound.

The halide solid electrolyte containing at least one element selected from the group consisting of metal elements other than Li and semi-metal elements has higher ion conductivity than the halide solid electrolyte, such as LiI, composed of just Li and a halogen element. Consequently, when the halide solid electrolyte containing at least one element selected from the group consisting of metal elements other than Li and semi-metal elements (that is, element M) is used for a battery, the output characteristics of the battery can be improved.

The first solid electrolyte material may be a material denoted by Composition formula (1) below,

$$Li_\alpha M_\beta X_\gamma \qquad \text{Formula (1)}$$

and herein, each of $\alpha$, $\beta$, and $\gamma$ represents a value greater than 0.

According to the above-described configuration, the ion conductivity of the first solid electrolyte material can be further improved. Consequently, the charge-discharge characteristics of the battery can be further improved.

In the first solid electrolyte material, M may include Y (=yttrium). That is, the first solid electrolyte material may contain Y as a metal element.

According to the above-described configuration, the ion conductivity of the first solid electrolyte material can be further improved. Consequently, the charge-discharge characteristics of the battery can be further improved.

In Composition formula (1), $2.7 \leq \alpha \leq 3$, $1 \leq \gamma \leq 1.1$, and $\gamma=6$ may be satisfied.

According to the above-described configuration, the ion conductivity of the first solid electrolyte material can be further improved. Consequently, the charge-discharge characteristics of the battery can be further improved.

The first solid electrolyte material containing Y may be, for example, a compound denoted by a composition formula $Li_aMe_bY_cX_6$. Herein, a+mb+3c=6 and c>0 are satisfied. Me represents at least one element selected from the group consisting of metal elements other than Li and Y and semi-metal elements. In this regard, m represents the valence of Me.

Me may be at least one element selected from the group consisting of Mg, Ca, Sr, Ba, Zn, Sc, Al, Ga, Bi, Zr, Hf, Ti, Sn, Ta, and Nb.

According to the above-described configuration, the ion conductivity of the first solid electrolyte material can be further improved.

The first solid electrolyte material may be a material denoted by Composition formula (A1) below, $$Li_{6-3d}Y_dX_6 \qquad \text{Formula (A1)}$$

in Composition formula (A1), X represents halogen elements and includes Cl, and 0<d<2 is satisfied.

According to the above-described configuration, the ion conductivity of the first solid electrolyte material can be further improved. Consequently, the charge-discharge efficiency of the battery can be further improved.

The first solid electrolyte material may be a material denoted by Composition formula (A2) below, $$Li_3YX_6 \qquad \text{Formula (A2)}$$

in Composition formula (A2), X represents halogen elements and includes Cl.

According to the above-described configuration, the ion conductivity of the first solid electrolyte material can be further improved. Consequently, the charge-discharge efficiency of the battery can be further improved.

The first solid electrolyte material may be a material denoted by Composition formula (A3) below, $$Li_{3-3\delta}Y_{1+\delta}Cl_6 \qquad \text{Formula (A3)}$$

in Composition formula (A3), 0<δ≤0.15 is satisfied.

According to the above-described configuration, the ion conductivity of the first solid electrolyte material can be further improved. Consequently, the charge-discharge efficiency of the battery can be further improved.

The first solid electrolyte material may be a material denoted by Composition formula (A4) below, $$Li_{3-3\delta+a}Y_{1+\delta-a}Me_aCl_{6-x}Br_x \qquad \text{Formula (A4)}$$

in Composition formula (A4), Me represents at least one element selected from the group consisting of Mg, Ca, Sr, Ba, and Zn, and −1<δ<2, 0<a<3, 0<(3−3δ+a), 0<(1+δ−a), and 0≤x<6 are satisfied.

According to the above-described configuration, the ion conductivity of the first solid electrolyte material can be further improved. Consequently, the charge-discharge efficiency of the battery can be further improved.

The first solid electrolyte material may be a material denoted by Composition formula (A5) below, $$Li_{3-3\delta}Y_{1+\delta-a}Me_aCl_{6-x}Br_x \qquad \text{Formula (A5)}$$

in Composition formula (A5), Me represents at least one element selected from the group consisting of Al, Sc, Ga, and Bi, and −1<δ<1, 0<a<2, 0<(1+δ−a), and 0≤x<6 are satisfied.

According to the above-described configuration, the ion conductivity of the first solid electrolyte material can be further improved. Consequently, the charge-discharge efficiency of the battery can be further improved.

The first solid electrolyte material may be a material denoted by Composition formula (A6) below, $$Li_{3-3\delta-a}Y_{1+\delta-a}Me_aCl_{6-x}Br_x \qquad \text{Formula (A6)}$$

in Composition formula (A6), Me represents at least one element selected from the group consisting of Zr, Hf, and Ti, and −1<δ<1, 0<a<1.5, 0<(3−3δ−a), 0<(1+δ−a), and 0≤x<6 are satisfied.

According to the above-described configuration, the ion conductivity of the first solid electrolyte material can be further improved. Consequently, the charge-discharge efficiency of the battery can be further improved.

The first solid electrolyte material may be a material denoted by Composition formula (A7) below, $$Li_{3-3\delta-2a}Y_{1+\delta-a}Me_aCl_{6-x}Br_x \qquad \text{Formula (A7)}$$

in Composition formula (A7), Me represents at least one element selected from the group consisting of Ta and Nb, and −1<δ<1, 0<a<1.2, 0<(3−3δ−2a), 0<(1+δ−a), and 0≤x<6 are satisfied.

According to the above-described configuration, the ion conductivity of the first solid electrolyte material can be further improved. Consequently, the charge-discharge efficiency of the battery can be further improved.

Regarding the first solid electrolyte material, for example, $Li_3YX_6$, $Li_2MgX_4$, $Li_2FeX_4$, $Li(Al,Ga,In)X_4$, $Li_3(Al,Ga,In)X_6$, and the like may be used. Herein, X includes Cl.

The second solid electrolyte material contains a material having high ion conductivity. Regarding the second solid electrolyte material, for example, a halide solid electrolyte containing one of or both bromine and iodine and the like is used.

The second solid electrolyte material may be a material containing Li, M', and X'. Herein, M' is at least one element selected from the group consisting of metal elements other than Li and semi-metal elements, and X' represents halogen elements including at least one element selected from the group consisting of Br and I.

According to the above-described configuration, the ion conductivity of the second solid electrolyte material can be further improved. Consequently, the charge-discharge efficiency of the battery can be further improved.

The second solid electrolyte material may be a material denoted by Composition formula (2) below, $$Li_{\alpha'}M'_{\beta'}X'_{\gamma'} \qquad \text{Formula (2)}$$

and herein, each of α', β', and γ' represents a value greater than 0.

According to the above-described configuration, the ion conductivity of the second solid electrolyte material can be further improved. Consequently, the charge-discharge efficiency of the battery can be further improved.

When the element X in the first solid electrolyte material includes Cl and at least one element selected from the group consisting of Br and I, A<B may be satisfied, and herein, the molar ratio of the total of Br and I included in X to X is denoted as A and the molar ratio of the total of Br and I included in X' to X' is denoted as B. In this regard, the element X is not limited to including Br or I, and the element X' is not limited to including Br or I.

According to the above-described configuration, the reaction overvoltage of the battery can be decreased and the output characteristics of the battery can be enhanced.

In Composition formula (1), X is not limited to including Br.

According to the above-described configuration, the oxidation resistance of the first solid electrolyte material can be improved. Consequently, the reaction overvoltage of a battery can be decreased.

When the element X in the first solid electrolyte material and the element X' in the second solid electrolyte material include Br, C<D may be satisfied, and herein, the molar ratio of Br included in X to X is denoted as C and the molar ratio of Br included in X' to X' is denoted as D.

According to the above-described configuration, the reaction overvoltage of the battery can be decreased and the output characteristics of the battery can be enhanced. As described above, the halide solid electrolyte containing Br has an oxidation resistance problem, and excellent oxidation resistance is exhibited as the content of Br in the anion is decreased. On the other hand, the ion conductivity of the halide solid electrolyte is improved by increasing the content of Br having a large ionic radius. That is, when C<D is satisfied, the first solid electrolyte material has excellent oxidation resistance compared with the second solid electrolyte material. On the other hand, the second solid electrolyte material can have higher ion conductivity than the first solid electrolyte material. Therefore, according to the above-described configuration, the solid electrolyte is suppressed from undergoing oxidative decomposition, the reaction overvoltage of the battery is decreased, and, in addition, the output characteristics of the battery can be enhanced.

In the second solid electrolyte material, M' may include Y. That is, the second solid electrolyte material may contain Y as a metal element.

According to the above-described configuration, the ion conductivity of the second solid electrolyte material can be further improved. Consequently, the charge-discharge characteristics of the battery can be further improved.

In Composition formula (2), X' may include Cl (=chlorine).

According to the above-described configuration, the ion conductivity of the second solid electrolyte material can be further improved by a mixed anion effect. Consequently, the charge-discharge characteristics of the battery can be further improved.

The second solid electrolyte material may be a material denoted by Composition formula (B1) below, $$Li_{6-3d}Y_dX_6 \qquad \text{Formula (B1)}$$

in Composition formula (B1), X represents halogen elements and includes at least one element selected from the group consisting of Br and I, and 0<d<2 is satisfied.

According to the above-described configuration, the ion conductivity of the second solid electrolyte material can be further improved. Consequently, the charge-discharge efficiency of the battery can be further improved.

The second solid electrolyte material may be a material denoted by Composition formula (B2) below, $$Li_3YX_6 \qquad \text{Formula (B2)}$$

in Composition formula (B2), X represents halogen elements and includes at least one element selected from the group consisting of Br and I.

According to the above-described configuration, the ion conductivity of the second solid electrolyte material can be further improved. Consequently, the charge-discharge efficiency of the battery can be further improved.

The second solid electrolyte material may be a material denoted by Composition formula (B3) below, $$Li_{3-3\delta+a}Y_{1+\delta-a}Me_aCl_{6-x-y}Br_xI_y \qquad \text{Formula (B3)}$$

in Composition formula (B3), Me represents at least one element selected from the group consisting of Mg, Ca, Sr, Ba, and Zn, and $-1<\delta<2$, $0<a<3$, $0<(3-3\delta+a)$, $0<(1+\delta-a)$, $0\le x<6$, $0\le y\le 6$, and $0<(x+y)\le 6$ are satisfied.

According to the above-described configuration, the ion conductivity of the second solid electrolyte material can be further improved. Consequently, the charge-discharge efficiency of the battery can be further improved.

The second solid electrolyte material may be a material denoted by Composition formula (B4) below, $$Li_{3-3\delta}Y_{1+\delta-a}Me_aCl_{6-x-y}Br_xI_y \qquad \text{Formula (B4)}$$

in Composition formula (B4), Me represents at least one element selected from the group consisting of Al, Sc, Ga, and Bi, and $-1<\delta<1$, $0<a<2$, $0<(1+\delta-a)$, $0\le x\le 6$, $0\le y\le 6$, and $0<(x+y)\le 6$ are satisfied.

According to the above-described configuration, the ion conductivity of the second solid electrolyte material can be further improved. Consequently, the charge-discharge efficiency of the battery can be further improved.

The second solid electrolyte material may be a material denoted by Composition formula (B5) below, $$Li_{3-3\delta-a}Y_{1+\delta-a}Me_aCl_{6-x-y}Br_xI_y \qquad \text{Formula (B5)}$$

in Composition formula (B5), Me represents at least one element selected from the group consisting of Zr, Hf, and Ti, and $-1<\delta<1$, $0<a<1.5$, $0<(3-3\delta-a)$, $0<(1+\delta-a)$, $0\le x\le 6$, $0\le y\le 6$, and $0<(x+y)\le 6$ are satisfied.

According to the above-described configuration, the ion conductivity of the second solid electrolyte material can be further improved. Consequently, the charge-discharge efficiency of the battery can be further improved.

The second solid electrolyte material may be a material denoted by Composition formula (B6) below, $$Li_{3-3\delta-2a}Y_{1+\delta-a}Me_aCl_{6-x-y}Br_xI_y \qquad \text{Formula (B6)}$$

in Composition formula (B6), Me represents at least one element selected from the group consisting of Ta and Nb, and $-1<\delta<1$, $0<a<1.2$, $0<(3-3\delta-2a)$, $0<(1+\delta-a)$, $0\le x\le 6$, $0\le y\le 6$, and $0<(x+y)\le 6$ are satisfied.

According to the above-described configuration, the ion conductivity of the second solid electrolyte material can be further improved. Consequently, the charge-discharge efficiency of the battery can be further improved.

Regarding the second solid electrolyte material, for example, $Li_3YX_6$, $Li_2MgX_4$, $Li_2FeX_4$, $Li(Al,Ga,In)X_4$, $Li_3(Al,Ga,In)X_6$, and the like may be used. Herein, X represents halogen elements and includes at least one element selected from the group consisting of Br and I.

A sulfide solid electrolyte may be used as the second solid electrolyte material. Regarding the sulfide solid electrolyte, for example, $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$ may be used. Further, LiX, $Li_2O$, $MO_q$, $Li_pMO_q$, or the like may be added to these. Herein, X represents at least one element selected from the group consisting of F, Cl, Br, and I, M represents at least one element selected from the group consisting of P, Si, Ge, B, Al, Ga, In, Fe, and Zn, and each of p and q represents a natural number.

The second solid electrolyte material may be the sulfide solid electrolyte. For example, the sulfide solid electrolyte may contain lithium sulfide and phosphorus sulfide. For example, the sulfide solid electrolyte may be $Li_2S-P_2S_5$.

According to the above-described configuration, the ion conductivity of the second solid electrolyte material can be further improved. $Li_2S$—$P_2S_5$ has high ion conductivity and is stable to reduction. Consequently, the charge-discharge efficiency of the battery can be further improved by using $Li_2S$—$P_2S_5$.

The positive electrode active material contains a material having metal-ion (for example, lithium ion) occlusion and release characteristics. Regarding the positive electrode active material, for example, lithium-containing transition metal oxides, transition metal fluorides, polyanion materials, fluorinated polyanion materials, transition metal sulfides, transition metal oxysulfides, and transition metal oxynitrides may be used. Examples of the lithium-containing transition metal oxides include $Li(NiCoAl)O_2$, $Li(NiCoMn)O_2$, and $LiCoO_2$. In particular, when the lithium-containing transition metal oxide is used as the positive electrode active material, the production cost can be reduced, and the average discharge voltage can be increased.

In the first embodiment, the positive electrode active material may be lithium-nickel cobalt-manganese oxide. For example, the positive electrode active material may be $Li(NiCoMn)O_2$.

According to the above-described configuration, the energy density and the charge-discharge efficiency of the battery can be further increased.

FIG. 1 is a sectional view illustrating the schematic configuration of a positive electrode material 1000 in the first embodiment.

The positive electrode material 1000 in the first embodiment includes a second solid electrolyte particle 100, a positive electrode active material particle 110, and a cover layer 111.

The positive electrode active material particle 110 and the second solid electrolyte particle 100 are separated from each other by the cover layer 111 and are not in direct contact with each other. That is, the positive electrode active material and the second solid electrolyte material are separated from each other by the first solid electrolyte material and are not in direct contact with each other. According to the above-described configuration, the reaction overvoltage of the battery can be suppressed from increasing.

The cover layer 111 contains the first solid electrolyte material. That is, the cover layer 111 is disposed on at least part of the surface of the positive electrode active material particle 110.

The thickness of the cover layer 111 may be greater than or equal to 1 nm and less than or equal to 100 nm.

The thickness of the cover layer 111 being greater than or equal to 1 nm suppresses direct contact between the positive electrode active material particle 110 and the second solid electrolyte particle 100 from occurring so that the side reaction of the second solid electrolyte material can be suppressed from occurring. Consequently, the charge-discharge efficiency of the battery can be improved. When the thickness of the cover layer 111 is less than or equal to 100 nm, the thickness of the cover layer 111 is not excessively large. As a result, the internal resistance of the battery can be sufficiently reduced. Consequently, the energy density of the battery can be increased.

The cover layer 111 may uniformly cover the surface of the positive electrode active material particle 110. As a result, direct contact between the positive electrode active material particle 110 and the second solid electrolyte particle 100 is suppressed from occurring so that the side reaction of the second solid electrolyte material can be suppressed from occurring. Consequently, the charge-discharge characteristics of the battery can be further improved, and the reaction overvoltage of the battery can be suppressed from increasing.

The cover layer 111 may cover part of the surface of the positive electrode active material particle 110. A plurality of positive electrode active material particles 110 being in direct contact with each other through portions not provided with the cover layer 111 improve the electron conductivity between the positive electrode active material particles 110. Consequently, the battery can operate with a high output.

There is no particular limitation regarding the shape of the second solid electrolyte material according to the first embodiment. The shape of the second solid electrolyte material according to the first embodiment may be, for example, needlelike, spherical, or ellipsoidal. For example, the shape of the second solid electrolyte material may be granular.

For example, when the shape of the second solid electrolyte material according to the first embodiment is granular (for example, spherical), the median diameter of the second solid electrolyte particles 100 may be less than or equal to 100 μm. The median diameter of the second solid electrolyte particles 100 being less than or equal to 100 μm enables the positive electrode active material particles 110 and the second solid electrolyte particles 100 to form a favorable dispersion state in the positive electrode material 1000. Consequently, the charge-discharge characteristics of the battery are improved. In the first embodiment, the median diameter of the second solid electrolyte particles 100 may be less than or equal to 10 μm.

According to the above-described configuration, the positive electrode active material particles 110 and the second solid electrolyte particle 100 can form a favorable dispersion state in the positive electrode material 1000.

In the first embodiment, the median diameter of the second solid electrolyte particles 100 may be smaller than the median diameter of the positive electrode active material particles 110.

According to the above-described configuration, the second solid electrolyte particles 100 and the positive electrode active material particles 110 can form a more favorable dispersion state in the positive electrode.

The median diameter of the positive electrode active material particles 110 may be greater than or equal to 0.1 μm and less than or equal to 100 μm.

The median diameter of the positive electrode active material particles 110 being greater than or equal to 0.1 μm enables the positive electrode active material particles 110 and the second solid electrolyte particles 100 to form a favorable dispersion state in the positive electrode material 1000. Consequently, the charge-discharge characteristics of the battery are improved. The median diameter of the positive electrode active material particles 110 being less than or equal to 100 μm accelerates lithium diffusion in the positive electrode active material particles 110. Consequently, the battery can operate with a high output.

The median diameter of the positive electrode active material particles 110 may be larger than the median diameter of the second solid electrolyte particles 100. Consequently, the positive electrode active material particles 110 and the second solid electrolyte particles 100 can form a favorable dispersion state.

In the positive electrode material 1000 according to the first embodiment, as illustrated in FIG. 1, the second solid electrolyte particle 100 and the cover layer 111 may be in contact with each other. In such an instance, the cover layer 111 and the positive electrode active material particle 110 are in contact with each other.

The positive electrode material 1000 according to the first embodiment may include a plurality of second solid electrolyte particles 100 and a plurality of positive electrode active material particles 110.

In the positive electrode material 1000 according to the first embodiment, the content of the second solid electrolyte particles 100 and the content of the positive electrode active material particles 110 may be equal to each other or may differ from each other.

Method for Producing Halide Solid Electrolyte

The halide solid electrolyte (for example, the first solid electrolyte material) according to the first embodiment may be produced by using, for example, the following method.

Raw material powders at a mixing ratio for forming a halide (for example, binary halide) having a predetermined composition are prepared. For example, when $Li_3YCl_6$ is produced, LiCl and $YCl_3$ at a molar ratio of 3:1 are prepared.

In such an instance, the elements of "M", "Me", and "X" in the above-described composition formulae are determined by selecting the types of the raw material powders. In addition, the values of "α", "β", "γ", "d", "δ", "a", "x", and "y" are determined by adjusting the types, the mixing ratio, and the synthesis process of the raw material powders.

The raw material powders are sufficiently mixed and pulverized. Thereafter, the raw material powders are reacted with each other by using a mechanochemical milling method. Alternatively, the raw material powders are sufficiently mixed and pulverized, and thereafter the powder mixture may be sintered in a vacuum or in an inert atmosphere.

By using these methods, the solid electrolyte material containing a crystal phase having the above-described composition is obtained.

In this regard, the configuration of the crystal phase in the solid electrolyte material (that is, the crystal structure) can be determined by adjusting the method for reacting the raw material powders and the reaction condition.

Second Embodiment

A second embodiment will be described below. The same explanations as in the first embodiment are appropriately omitted.

Figure 2:
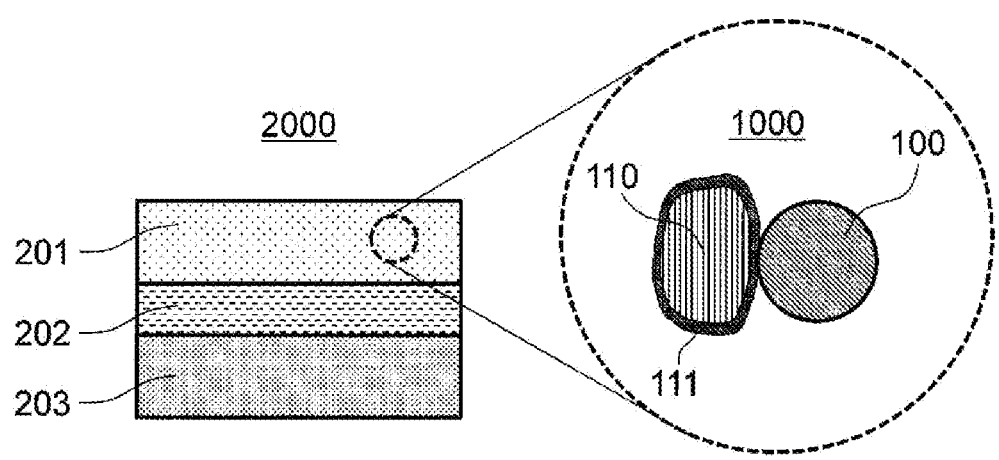
FIG. 2 is a sectional view illustrating the schematic configuration of a battery in a second embodiment.

FIG. 2 is a sectional view illustrating the schematic configuration of a battery 2000 in the second embodiment.

The battery 2000 according to the second embodiment includes a positive electrode 201, an electrolyte layer 202, and a negative electrode 203.

The positive electrode 201 contains the positive electrode material (for example, positive electrode material 1000) according to the first embodiment.

The electrolyte layer 202 is disposed between the positive electrode 201 and the negative electrode 203.

According to the above-described configuration, the reaction overvoltage of the battery can be suppressed from increasing.

Regarding the volume ratio "v:(100−v)" of the positive electrode active material particles 110 to the second solid electrolyte particles 100 included in the positive electrode 201, $30 \leq v \leq 95$ may be satisfied. Herein, v denotes the volume ratio of the positive electrode active material particles 110 included in the positive electrode 201, where the total volume of the positive electrode active material particles 110 and the second solid electrolyte particles 100 is assumed to be 100. When $30 \leq v$ is satisfied, a sufficient energy density can be ensured. When $v \leq 95$ is satisfied, the battery can operate with a high output.

The thickness of the positive electrode 201 may be greater than or equal to 10 μm and less than or equal to 500 μm. The thickness of the positive electrode 201 being greater than or equal to 10 μm enables a sufficient energy density of the battery to be ensured. The thickness of the positive electrode 201 being less than or equal to 500 μm enables the battery to operate with a high output.

The electrolyte layer 202 contains an electrolyte material. The electrolyte material is, for example, a solid electrolyte material (that is, a third solid electrolyte material). That is, the electrolyte layer 202 may be a solid electrolyte layer.

Regarding the third solid electrolyte material contained in the electrolyte layer 202, halide solid electrolytes, sulfide solid electrolytes, oxide solid electrolytes, polymer solid electrolytes, or complex hydride solid electrolytes may be used.

The same halide solid electrolyte as the first solid electrolyte material according to the first embodiment may be used as the third solid electrolyte material. That is, the electrolyte layer 202 may contain the same halide solid electrolyte as the first solid electrolyte material according to the first embodiment. When the second solid electrolyte material according to the first embodiment is the halide solid electrolyte, the same halide solid electrolyte as the second solid electrolyte material may be used as the third solid electrolyte material. That is, the electrolyte layer 202 may contain the same halide solid electrolyte as the second solid electrolyte material according to the first embodiment.

According to the above-described configuration, the output density and the charge-discharge characteristics of the battery can be further improved.

Regarding the third solid electrolyte material contained in the electrolyte layer 202, a halide solid electrolyte different from the first solid electrolyte material according to the first embodiment may be used. That is, the electrolyte layer 202 may contain a halide solid electrolyte different from the first solid electrolyte material according to the first embodiment. When the second solid electrolyte material is the halide solid electrolyte, a halide solid electrolyte different from the second solid electrolyte material may be used as the third solid electrolyte material. That is, the electrolyte layer 202 may contain the halide solid electrolyte different from the second solid electrolyte material according to the first embodiment.

According to the above-described configuration, the charge-discharge characteristics of the battery can be further improved.

Regarding the third solid electrolyte material, a halide solid electrolyte different from the first solid electrolyte material and the second solid electrolyte material according to the first embodiment may be used. That is, the electrolyte layer 202 may contain a halide solid electrolyte different from the first solid electrolyte material and the second solid electrolyte material according to the first embodiment.

According to the above-described configuration, the charge-discharge characteristics of the battery can be further improved.

Regarding the third solid electrolyte material, the sulfide solid electrolyte may be used. That is, the electrolyte layer 202 may contain the sulfide solid electrolyte.

According to the above-described configuration, the charge-discharge characteristics of the battery can be further improved.

Examples of the sulfide solid electrolyte used for the third solid electrolyte material include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Further, LiX, $Li_2O$, $MO_q$, $Li_pMO_q$, or the like may be added to these. Herein, X represents at least one element selected from the group consisting of F, Cl, Br, and I, M represents at least one element selected from the group consisting of P, Si, Ge, B, Al, Ga, In, Fe, and Zn, and each of p and q represents a natural number.

When the second solid electrolyte material according to the first embodiment is the sulfide solid electrolyte, the same halide solid electrolyte as the second solid electrolyte material may be used as the third solid electrolyte material. That is, the electrolyte layer 202 may contain the same sulfide solid electrolyte as the second solid electrolyte material.

According to the above-described configuration, since the sulfide solid electrolyte having excellent reduction stability is contained, a low-potential negative electrode material such as graphite or lithium metal can be used, and the energy density of the battery can be improved. According to the configuration in which the electrolyte layer 202 contains the same sulfide solid electrolyte as the second solid electrolyte material according to the first embodiment, the charge-discharge characteristics of the battery can be improved.

Regarding the oxide solid electrolyte of the third solid electrolyte material, for example, NASICON type solid electrolytes represented by $LiTi_2(PO_4)_3$ and an element substitution product thereof, $(LaLi)TiO_3$-based perovskite solid electrolytes, LiSiCON type solid electrolytes represented by $Li_{14}ZnGe_4O_{16}$, $Li_4SiO_4$, or $LiGeO_4$ and an element substitution product thereof, garnet type solid electrolytes represented by $Li_7La_3Zr_2O_{12}$ and an element substitution product thereof, $Li_3PO_4$ and an N-substitution product thereof, and glass or glass ceramic in which a Li—B—O compound such as $LiBO_2$, $Li_3BO_3$, or the like serves as a base and $Li_2SO_4$, $Li_2CO_3$, or the like is added are used.

Regarding the polymer solid electrolyte of the third solid electrolyte material, for example, a compound of a polymer compound and a lithium salt may be used. The polymer compound may have an ethylene oxide structure. The polymer compound having the ethylene oxide structure can contain much lithium salt. Consequently, the ion conductivity can be further increased. Regarding the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and the like may be used. A lithium salt selected from the lithium salts described as examples may be used alone.

Alternatively, a mixture of at least two types of lithium salts selected from the lithium salts described as examples may be used.

Regarding the complex hydride solid electrolyte of the third solid electrolyte material, for example, $LiBH_4$—LiI, $LiBH_4$—$P_2S_5$, and the like may be used.

The electrolyte layer 202 may contain the third solid electrolyte material as a primary component. That is, the electrolyte layer 202 may contain, for example, greater than or equal to 50% on a mass ratio relative to the entire electrolyte layer 202 basis (that is, greater than or equal to 50% by mass) of the third solid electrolyte material.

According to the above-described configuration, the charge-discharge characteristics of the battery can be further improved.

The electrolyte layer 202 may contain, for example, greater than or equal to 70% on a mass ratio relative to the entire electrolyte layer 202 basis (that is, greater than or equal to 70% by mass) of the third solid electrolyte material.

According to the above-described configuration, the charge-discharge characteristics of the battery can be further improved.

The electrolyte layer 202 may contain the third solid electrolyte material as a primary component and may further contain incidental impurities or starting raw materials used for synthesizing the third solid electrolyte material, by-products, decomposition products, and the like.

The electrolyte layer 202 may contain, for example, 100% on a mass ratio relative to the entire electrolyte layer 202 basis (that is, 100% by mass) of the third solid electrolyte material except incidental impurities.

According to the above-described configuration, the charge-discharge characteristics of the battery can be further improved.

As described above, the electrolyte layer 202 may be composed of just the third solid electrolyte material.

The electrolyte layer 202 may contain at least two of the materials listed as the third solid electrolyte material. For example, the electrolyte layer 202 may contain the halide solid electrolyte and the sulfide solid electrolyte.

The thickness of the electrolyte layer 202 may be greater than or equal to 1 μm and less than or equal to 300 μm. When the thickness of the electrolyte layer 202 is greater than or equal to 1 μm, short circuit between the positive electrode 201 and the negative electrode 203 does not readily occur. When the thickness of the electrolyte layer 202 is less than or equal to 300 μm, the battery can operate with a high output.

The negative electrode 203 contains a material having metal-ion (for example, lithium ion) occlusion and release characteristics. The negative electrode 203 contains, for example, a negative electrode active material.

Regarding the negative electrode active material, metal materials, carbon materials, oxides, nitrides, tin compounds, silicon compounds, and the like may be used. The metal material may be a simple metal. Alternatively, the metal material may be an alloy. Examples of the metal material include lithium metal and lithium alloys. Examples of the carbon material include natural graphite, coke, graphitizing carbon, carbon fiber, spherical carbon, artificial carbon, and amorphous carbon. From the viewpoint of the capacity density, silicon (Si), tin (Sn), silicon compounds, and tin compounds may be used.

The negative electrode 203 may contains a solid electrolyte material. The solid electrolyte materials described as examples of the material for constituting the electrolyte layer 202 may be used as the solid electrolyte material. According to the above-described configuration, the lithium ion conductivity inside the negative electrode 203 can be increased and the battery can operate with a high output.

The median diameter of the negative electrode active material particles may be greater than or equal to 0.1 μm and less than or equal to 100 μm. When the median diameter of the negative electrode active material particles is greater than or equal to 0.1 μm, the negative electrode active material particles and the solid electrolyte material can form a favorable dispersion state in the negative electrode. Consequently, the charge-discharge characteristics of the battery are improved. When the median diameter of the negative electrode active material particles is less than or equal to 100 μm, lithium diffusion in the negative electrode active material particles is accelerated. Consequently, the battery can operate with a high output.

The median diameter of the negative electrode active material particles may be larger than the median diameter of the solid electrolyte material. Consequently, the negative electrode active material particles and the solid electrolyte material can form a favorable dispersion state.

Regarding the volume ratio "v:(100−v)" of the negative electrode active material particles to the solid electrolyte material included in the negative electrode 203, 30≤v≤95 may be satisfied. Herein, v denotes the volume ratio of the negative electrode active material particles included in the negative electrode 203, where the total volume of the negative electrode active material particles and the solid electrolyte material is assumed to be 100. When 30≤v is satisfied, a sufficient energy density can be ensured. When v≤95 is satisfied, the battery can operate with a high output.

The thickness of the negative electrode 203 may be greater than or equal to 10 µm and less than or equal to 500 µm. The thickness of the negative electrode being greater than or equal to 10 µm enables a sufficient energy density of the battery to be ensured. The thickness of the negative electrode being less than or equal to 500 µm enables the battery to operate with a high output.

To improve the adhesiveness between particles, a binder may be contained in at least one selected from the group consisting of the positive electrode 201, the electrolyte layer 202, and the negative electrode 203. The binder is used for the purpose of improving the bondability of the materials constituting the electrode. Examples of the binder include polyvinylidene fluorides, polytetrafluoroethylenes, polyethylenes, polypropylenes, aramid resins, polyamides, polyimides, polyamide imides, polyacrylonitriles, polyacrylic acids, polyacrylic acid methyl esters, polyacrylic acid ethyl esters, polyacrylic acid hexyl esters, polymethacrylic acids, polymethacrylic acid methyl esters, polymethacrylic acid ethyl esters, polymethacrylic acid hexyl esters, polyvinyl acetates, polyvinylpyrrolidones, polyethers, polyether sulfones, hexafluoropolypropylenes, styrene-butadiene rubber, and carboxymethyl cellulose. Regarding the binder, copolymers of at least two materials selected from the group consisting of tetrafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. In addition, mixtures of at least two selected from these may be used.

To increase the electron conductivity, at least one of the positive electrode 201 or the negative electrode 203 may contain a conductive auxiliary agent. Regarding the conductive auxiliary agent, for example, graphite such as natural graphite or artificial graphite, carbon black such as acetylene black or Ketjenblack, conductive fibers such as carbon fiber or metal fiber, metal powders such as carbon fluoride or aluminum, conductive whiskers such as zinc oxide or potassium titanate, conductive metal oxides such as titanium oxide, and conductive polymer compounds such as polyanilines, polypyrroles, or polythiophenes may be used. The carbon conductive auxiliary agent being used as the conductive auxiliary agent enables the cost to be reduced.

Examples of the shape of the battery according to the second embodiment include a coin type, a cylindrical type, a square type, a sheet type, a button type, a flat type, and a stacked type.

EXAMPLES

The present disclosure will be described below in detail with reference to the examples and the comparative examples.

Example 1

Production of Solid Electrolyte Material $Li_3YCl_6$

In an argon glove box having a dew point of lower than or equal to −60° C. (hereafter referred to as "in an argon atmosphere"), LiCl and $YCl_3$ serving as raw material powders were weighed so that the molar ratio $LiCl:YCl_3=3:1$ was attained. Thereafter, milling treatment was performed for 25 hours at 600 rpm by using a planetary ball mill (Model P-7 produced by Fritsch) so as to obtain a powder of a halide solid electrolyte $Li_3YCl_6$.

Example 2

Production of Solid Electrolyte Material $Li_3YBr_3Cl_3$

In an argon atmosphere, LiBr, $YBr_3$, LiCl, and $YCl_3$ serving as raw material powders were weighed so that the molar ratio $LiBr:YBr_3:LiCl:YCl_3=3:1:3:1$ was attained. Thereafter, milling treatment was performed for 25 hours at 600 rpm by using a planetary ball mill (Model P-7 produced by Fritsch) so as to obtain a powder of a halide solid electrolyte $Li_3YBr_3Cl_3$.

Example 3

Production of Solid Electrolyte Material $LiAlCl_4$

In an argon atmosphere, LiCl and $AlCl_3$ serving as raw material powders were weighed so that the molar ratio $LiCl:AlCl_3=1:1$ was attained. Thereafter, milling treatment was performed for 25 hours at 600 rpm by using a planetary ball mill (Model P-7 produced by Fritsch) so as to obtain a powder of a halide solid electrolyte $LiAlCl_4$.

Example 4

Production of Solid Electrolyte Material $Li_{2.7}Y_{1.1}Cl_6$

In an argon atmosphere, LiCl and $YCl_3$ serving as raw material powders were weighed so that the molar ratio $LiCl:YCl_3=2.7:1.1$ was attained. Thereafter, milling treatment was performed for 25 hours at 600 rpm by using a planetary ball mill (Model P-7 produced by Fritsch) so as to obtain a powder of a halide solid electrolyte $Li_{2.7}Y_{1.1}Cl_6$.

Comparative Example 1

Production of Solid Electrolyte Material $Li_3YBr_6$

In an argon atmosphere, LiCl and $YBr_3$ serving as raw material powders were weighed so that the molar ratio $LiCl:YBr_3=3:1$ was attained. Thereafter, milling treatment was performed for 25 hours at 600 rpm by using a planetary ball mill (Model P-7 produced by Fritsch) so as to obtain a powder of a halide solid electrolyte $Li_3YBr_6$.

Comparative Example 2

Production of Solid Electrolyte Material $Li_2S$—$P_2S_5$

In an argon atmosphere, $Li_2S$ and $P_2S_5$ serving as raw material powders were weighed so that the molar ratio $Li_2S:P_2S_5=75:25$ was attained. These were pulverized and mixed in a mortar. Thereafter, milling treatment was performed for 10 hours at 510 rpm by using a planetary ball mill (Model P-7 produced by Fritsch) so as to obtain a vitreous solid electrolyte. The resulting vitreous solid electrolyte was heat-treated in an inert atmosphere at 270 degrees Celsius for 2 hours. As a result, a glass-ceramic sulfide solid electrolyte $Li_2S$—$P_2S_5$ was obtained.

Production of Mix

A solid electrolyte material of each of Examples 1 to 4 and Comparative examples 1 and 2 and a SUS powder were weighed so as to attain a volume ratio of 50:50 and were mixed in a mortar so as to produce a mix.

Production of Electrochemical Cell

The solid electrolyte material of each of Examples 1 to 4 and Comparative examples 1 and 2, the mix, and the halide solid electrolyte $Li_2S$—$P_2S_5$ were used, and the following steps were performed.

Initially, 57.41 mg of $Li_2S$—$P_2S_5$ was placed into an insulating outer cylinder. The $Li_2S$—$P_2S_5$ was press-formed at a pressure of 80 MPa so as to obtain a counter-electrode solid electrolyte layer.

Subsequently, the solid electrolyte material of each of Examples 1 to 4 and Comparative example 1 was placed on the counter-electrode solid electrolyte layer. Regarding Examples 1 to 4 and Comparative example 1, the mass of placed solid electrolyte material was set to be 23.45 mg, 29.13 mg, 19.8 mg, 23.87 mg, and 35.14 mg, respectively. The solid electrolyte material was press-formed at a pressure of 80 MPa so as to obtain a working-electrode solid electrolyte layer.

The mix of each of Examples 1 to 4 and Comparative example 1 was placed on the working-electrode solid electrolyte layer. Regarding comparative example 2, the mix according to Comparative example 2 was placed on the counter-electrode solid electrolyte layer. Regarding Examples 1 to 4 and Comparative examples 1 and 2, the mass of placed mix was set to be 16.38 mg, 17.33 mg, 15.60 mg, 16.44 mg, 18.34 mg, and 15.70 mg, respectively. The mix was press-formed at a pressure of 360 MPa so as to obtain a multilayer body composed of the working electrode, the working-electrode solid electrolyte layer, and the counter-electrode solid electrolyte layer.

Thereafter, In metal (thickness of 200 μm), Li metal (thickness of 300 μm), and In metal (thickness of 200 μm) were stacked in this order on the counter-electrode solid electrolyte layer. The resulting multilayer body was press-formed at a pressure of 80 MPa so as to obtain a counter electrode.

Subsequently, stainless steel collectors were disposed on and under the multilayer body and the collector was provided with a collector lead.

Finally, the interior of the insulating outer cylinder was blocked from the outside air and hermetically sealed by using an insulating ferrule. In this manner, an electrochemical cell of each of Examples 1 to 4 and Comparative examples 1 and 2 was produced.

In this regard, the inner diameter of the insulating outer cylinder used for producing the electrochemical cell was 9.5 mm. That is, the projected area of the working electrode was 0.71 cm².

Electrochemical Evaluation

The electrochemical cell of each of Examples 1 to 4 and Comparative examples 1 and 2 was used, and the electrochemical evaluation was performed under the condition described below.

The electrochemical cell was placed in a constant-temperature bath at 25° C.

The voltage was swept from the open-circuit voltage of the electrochemical cell to 4.7 V vs. In—Li. Regarding the present electrochemical evaluation, the technique called linear sweep voltammetry was used. In the present electrochemical cell, In—Li was used for the counter electrode, and a measured value was 0.6 V less than the voltage with reference to Li metal. That is, 4.7 V vs. In—Li was synonymous with 5.3 V vs. Li.

By using the above-described technique, the oxidation-side potential stability of the electrochemical cell of each of Examples 1 to 4 and Comparative examples 1 and 2 was evaluated. The evaluation results are illustrated in FIG. 3. In FIG. 3, the vertical axis represents the amount of reaction current, and the horizontal axis represents the sweep voltage.

When the voltage of the working electrode of the electrochemical cell was swept toward the oxidation side, a current derived from a nonfaradaic reaction without electron transfer passed and a very small current derived from a side reaction of surface-adsorbed water or an impurity of a conductive auxiliary agent passed. Thereafter, an excessive current due to oxidative decomposition of a solid electrolyte began to pass. In the present test, the voltage at which the value of a current began to pass was greater than or equal to 3 μA was denoted as an oxidative decomposition voltage. The oxidative decomposition voltage of each of Examples 1 to 4 and Comparative examples of 1 and 2 is described in Table 1.

TABLE 1

| | Solid electrolyte material | Oxidative decomposition voltage V vs. In—Li |
| --- | --- | --- |
| Example 1 | $Li_3YCl_6$ | 4.20 |
| Example 2 | $Li_3YBr_3Cl_6$ | 3.88 |
| Example 3 | $LiAlCl_4$ | 4.18 |
| Example 4 | $Li_{2.7}Y_{1.1}Cl_6$ | 4.47 |
| Comparative example 1 | $Li_3YBr_6$ | 3.37 |
| Comparative example 2 | $Li_2S$—$P_2S_5$ | 2.07 |

Consideration

The solid electrolyte materials of Examples 1 to 4 and Comparative example 1 are halide solid electrolytes, and the solid electrolyte material of Comparative example 2 is a sulfide solid electrolyte. It is clarified that the halide solid electrolytes generally have a higher oxidative decomposition voltage, that is, higher oxidation resistance, than the sulfide solid electrolyte.

It is clarified that the values of the oxidative decomposition voltage of the halide solid electrolytes are not constant and differ from each other in accordance with the material. For example, $Li_3YBr_6$ of Comparative example 1 undergoes an oxidative decomposition reaction at relatively low 3.37 V vs. In—Li. Bromine has a relatively large ionic radius and has a small interaction force with a cationic component constituting the halide solid electrolyte (that is, Li and Y). Consequently, it is conjectured that an electron is readily taken from bromine, and oxidation readily occurs.

On the other hand, it is clarified that the halide solid electrolyte containing chlorine and not containing bromine and iodine, such as $Li_3YCl_6$ illustrated in Example 1, exhibits a high oxidative decomposition voltage. The reason for this is conjectured to be that, since an anion containing chlorine having a relatively small ionic radius is strongly bonded to a cation composed of a metal element or a semi-metal element, an oxidation reaction of chlorine, that is, a side reaction in which an electron is taken from bromine does not readily proceed. As illustrated in Examples 1, 3, and 4, it is clarified that the halide solid electrolyte containing just chlorine and not containing bromine and iodine as the halogen element exhibits particularly excellent oxidation resistance of greater than or equal to 4.0 V vs. In—Li.

It is clarified that, as illustrated by $Li_3YBr_3Cl_3$ in Example 2, even when the halide solid electrolyte contains bromine, chlorine being further contained increases the oxidative decomposition voltage from 3.37 to 3.88 V vs. In—Li compared with $Li_3YBr_6$ composed of just bromine as illustrated in Comparative example 1. The reason for this is conjectured to be that, since chlorine having a relatively small ionic radius and strong bondability to a cation is concurrently contained, the bonding distance between a cation and an anion is decreased and, accordingly, bondability between bromine and the cation is enhanced so as to suppress bromine from undergoing an oxidation reaction.

It is clarified that, even the halide solid electrolyte not containing Y as a cation other than Li, such as LiAlCl$_4$ illustrated in Example 3, exhibits very excellent oxidation resistance of greater than or equal to 4.0 V vs. In—Li. According to the above-described results, it is ascertained that excellent oxidation resistance is exhibited by chlorine being contained as the anion regardless of the cation species contained in the halide solid electrolyte.

After considering all the above-described findings, it can be said that the positive electrode material containing the positive electrode active material, the cover layer that covers at least part of the surface of the positive electrode active material and that contains the first solid electrolyte material, and the second solid electrolyte material enables the second solid electrolyte material to be suppressed from undergoing an oxidation reaction so as to suppress the reaction overvoltage of the battery from increasing. For example, when a material having high ion conductivity but having an oxidation resistance problem (for example, the halide solid electrolyte, the sulfide solid electrolyte, or the like that contains one of or both bromine and iodine) is used as the second solid electrolyte material, the halide solid electrolyte that contains chlorine having excellent oxidation resistance (that is, the first solid electrolyte material) being located on the surface of the positive electrode active material suppresses direct contact between the positive electrode active material and the second solid electrolyte material from occurring. This is because the electron resistance of the material that may be used for the first solid electrolyte material is very high and, therefore, direct transfer of electrons between the positive electrode active material and the second solid electrolyte material through the first solid electrolyte material is suppressed from occurring. According to the above-described configuration, the output characteristics of the battery can be improved while the second solid electrolyte material is suppressed from undergoing an oxidation reaction so as to decrease the reaction overvoltage of the battery.

The battery according to the present disclosure can be exploited as, for example, all-solid lithium ion secondary batteries.

What is claimed is:

1. A positive electrode material comprising:
   a positive electrode active material;
   a cover layer that covers at least part of a surface of the positive electrode active material and that contains a first solid electrolyte material; and
   a second solid electrolyte material that is a material different from the first solid electrolyte material,
   wherein the first solid electrolyte material contains Li, M, and X and does not contain sulfur,
   M represents Y and at least one element selected from the group consisting of semi-metal elements and metal elements other than Li and Y, and
   X represents halogen elements including Cl.

2. The positive electrode material according to claim 1, wherein the first solid electrolyte material is denoted by Composition formula (1) below, $$Li_\alpha M_\beta X_\gamma \quad \text{Formula (1)}$$

and herein, each of $\alpha$, $\beta$, and $\gamma$ represents a value greater than 0.

3. The positive electrode material according to claim 2, wherein $2.7 \leq \alpha \leq 3$, $1 \leq \beta \leq 1.1$, and $\gamma=6$ are satisfied.

4. The positive electrode material according to claim 1, wherein the second solid electrolyte material contains Li, M', and X',
   M' is at least one element selected from the group consisting of metal elements other than Li and semi-metal elements, and
   X' represents halogen elements including at least one element selected from the group consisting of Br and I.

5. The positive electrode material according to claim 4, wherein the second solid electrolyte material is denoted by Composition formula (2) below, $$Li_{\alpha'} M'_{\beta'} X'_{\beta'} \quad \text{Formula (2)}$$

and herein, each of $\alpha'$, $\beta'$, and $\gamma'$ represents a value greater than 0.

6. The positive electrode material according to claim 4, wherein X includes Cl and at least one element selected from the group consisting of Br and I, and
   A<B is satisfied, and herein, a molar ratio of a total of Br and I included in X to X is denoted as A and a molar ratio of a total of Br and I included in X' to X is denoted as B.

7. The positive electrode material according to claim 1, wherein X does not include Br.

8. The positive electrode material according to claim 4, wherein X and X' include Br, and
   C<D is satisfied, and herein, a molar ratio of Br included in X to X is denoted as C and the molar ratio of Br included in X' to X is denoted as D.

9. The positive electrode material according to claim 4, wherein M' includes yttrium.

10. The positive electrode material according to claim 4, wherein X' includes Cl and at least one element selected from the group consisting of Br and I.

11. The positive electrode material according to claim 1, wherein the second solid electrolyte material is a sulfide solid electrolyte.

12. The positive electrode material according to claim 11, wherein the sulfide solid electrolyte contains lithium sulfide and phosphorus sulfide.

13. The positive electrode material according to claim 11, wherein the sulfide solid electrolyte is $Li_2S$—$P_2S_5$.

14. The positive electrode material according to claim 1, wherein the positive electrode active material is lithium-nickel-cobalt manganese oxide.

15. The positive electrode material according to claim 1, wherein the positive electrode active material and the second solid electrolyte material are separated from each other by the first solid electrolyte material and are not in direct contact with each other.

16. A battery comprising:
   a positive electrode containing the positive electrode material according to claim 1;
   a negative electrode; and
   an electrolyte layer disposed between the positive electrode and the negative electrode.

17. The battery according to claim 16, wherein the electrolyte layer contains the same material as the first solid electrolyte material or the second solid electrolyte material.

18. The battery according to claim 17, wherein the electrolyte layer contains the same material as the first solid electrolyte material.

19. The battery according to claim 16, wherein the electrolyte layer contains a halide solid electrolyte different from the first solid electrolyte material.

20. The battery according to claim 19, wherein the electrolyte layer contains a halide solid electrolyte different from the first solid electrolyte material and the second solid electrolyte material.

21. The battery according to claim 16, wherein the electrolyte layer contains a sulfide solid electrolyte.

22. The positive electrode material according to claim 4, wherein M' is Y and at least one element selected from the group consisting of semi-metal elements and metal elements other than Li and Y.

23. A positive electrode material comprising:
a positive electrode active material;
a cover layer that covers at least part of a surface of the positive electrode active material and that contains a first solid electrolyte material; and
a second solid electrolyte material that is a material different from the first solid electrolyte material,
wherein the first solid electrolyte material contains Li, M, and X and does not contain sulfur,
M represents at least one element selected from the group consisting of metal elements other than Li and semi-metal elements, and
X represents halogen elements including Cl and at least one element selected from the group consisting of Br and I.

24. A battery comprising:
a positive electrode containing the positive electrode material according to claim 23;
a negative electrode; and
an electrolyte layer disposed between the positive electrode and the negative electrode.

* * * * *